(12) United States Patent
Lee (10) Patent No.: US 9,010,359 B2
(45) Date of Patent: Apr. 21, 2015

(54) SAFETY PROTECTION DEVICE AND CONTROL METHOD THEREOF

(76) Inventor: Chun-Hsien Lee, North Point (HK)

( * ) Notice: Subject to any disclaimer, the term of this patent is extended or adjusted under 35 U.S.C. 154(b) by 492 days.

(21) Appl. No.: 13/411,495

(22) Filed: Mar. 2, 2012

(65) Prior Publication Data

US 2013/0125990 A1    May 23, 2013

(30) Foreign Application Priority Data

Nov. 18, 2011  (CN) .......................... 2011 1 0369189

(51) Int. Cl.
| | |
|---|---|
| F16K 17/00 | (2006.01) |
| E03B 7/07 | (2006.01) |
| F16K 31/48 | (2006.01) |
| F16K 31/44 | (2006.01) |

(52) U.S. Cl.
CPC ..................................... E03B 7/071 (2013.01)

(58) Field of Classification Search
CPC ........ F16K 17/00; G05D 7/00; G05B 19/048; E03B 7/071
USPC ...................... 137/624.11, 624.12, 456, 78.3; 251/248, 230, 250
See application file for complete search history.

(56) References Cited

U.S. PATENT DOCUMENTS

| | | | | |
|---|---|---|---|---|
| 2,177,784 | A | * | 10/1939 | Oscherwitz et al. .......... 137/463 |
| 3,028,050 | A | * | 4/1962 | Nelson ............................ 222/16 |
| 4,106,670 | A | * | 8/1978 | Takeda ............................ 222/20 |
| 4,633,905 | A | * | 1/1987 | Wang ....................... 137/624.11 |
| 4,951,915 | A | * | 8/1990 | Piao ................................. 251/14 |
| 5,971,011 | A | * | 10/1999 | Price .............................. 137/460 |
| 6,209,576 | B1 | * | 4/2001 | Davis ......................... 137/487.5 |
| 6,837,271 | B1 | * | 1/2005 | Saint ........................ 137/624.12 |
| 7,779,852 | B2 | * | 8/2010 | Burlage et al. .................... 137/1 |

* cited by examiner

Primary Examiner — Craig Schneider
Assistant Examiner — Josephine Trinidad-Borges
(74) Attorney, Agent, or Firm — Leong C. Lei (57) ABSTRACT

The safety protection device contains a control unit, a transmission unit, and a throttle unit. The control method contains the following steps: step A: setting a condition parameter X of the control unit; step B: engaging the safety protection device into an operational mode; step C: determining if an external condition $X_0$ satisfies the condition parameter X; if yes, continuing to the step D; otherwise, returning to the step B; and step D: turning off the throttle unit through the transmission unit driven by the control unit. A valve is configured inside the throttle unit and connected to a base through a driving device and to the transmission unit. The control unit contains an energy storage/release device configured on the throttle unit. A moveable block is configured inside the energy storage/release device. The transmission unit, together with the block, controls the open and close of the valve.

5 Claims, 6 Drawing Sheets

SAFETY PROTECTION DEVICE AND CONTROL METHOD THEREOF

TECHNICAL FIELD OF THE INVENTION

The present invention is generally related to safety control technology, and more particular to a safety protection device and a related control method.

DESCRIPTION OF THE PRIOR ART

The existing safety protection device or its control method is engaged under a single condition. The following are some examples.

An automatic faucet usually cannot provide the adequate amount of water. It is also difficult to have all faucets in the households and public washrooms replaced with the automatic faucets. The automatic faucet also cannot provide effective protection if the pipe explodes.

The electric heating water bottle only detects if the temperature has reached a specific condition before heating is stopped. However, if the bottle is opened, the temperature is hard to reach the specific condition. The bottle as such is overheated for an unnecessarily extended period of time and the boiled water might overflow.

The pump for water tower stops only when the amount of water in the water tower has reached a specific level. If there is water outage, the pump will continue to work and therefore burns down.

SUMMARY OF THE INVENTION

Therefore, a safety protection device and a related control method are provided herein.

The safety protection device contains a control unit, a transmission unit, and a throttle unit. The control method contains the following steps.

Step A: setting a condition parameter X of the safety protection device's control unit;

Step B: engaging the safety protection device into an operational mode;

Step C: determining if an external condition $X_0$ satisfies the condition parameter X; if yes, continuing to the step D; otherwise, returning to the step B; and Step D: turning off the throttle unit through the transmission unit driven by the control unit so as to enforce protection.

Additionally, the step A further contains the step of setting another condition parameter Y of the safety protection device's control unit; and the step B further contains the step $B_{y1}$: determining if an external condition $Y_0$ satisfies the condition parameter Y and, if yes, returning to the step A.

Additionally, the step A further contains the step of setting yet another condition parameter Z of the safety protection device's control unit; and the step B further contains the step $B_{y1}$: determining if an external condition $Z_0$ satisfies the condition parameter Z and, if yes, issuing an indication and returning to the step A.

Additionally, the step A further contains the step of setting multiple condition parameters Yi of the safety protection device's control unit and, when any one of multiple external conditions $Y_0$ satisfies any one of the condition parameters Yi, returning to the step A.

Additionally, the condition parameter Z contains multiple condition parameter values Zi.

The step B further contains the step $B_{z2}$: determining if any one of multiple external conditions $Z_0$ satisfies any one of the condition parameter values Zi and, if yes, issuing an indication and continuing to the step D.

The present invention also provides a safety protection device, which contains a control unit; a transmission unit; and a throttle unit; where a valve is configured inside the throttle unit; the valve is connected to a base through a driving device; the valve is connected to the transmission unit; the control unit contains an energy storage/release device configured on the throttle unit; a moveable block is configured inside the energy storage/release device; and the transmission unit, together with the block, controls the open and close of the valve.

Additionally, the control unit of the safety protection device has two or more configurable condition parameters.

Additionally, the safety protection device further contains a transducer device which turns power output by a fluid material flowing through the safety protection device into a driving force.

Additionally, the transmission unit contains an elastic element, a transmission block, a coupling element, an outer gear, an inner gear, a first one-way gear engaging the outer gear, and a second one-way gear engaging the inner gear; an end of the elastic element is connected to the throttle unit and the other end is connected to the transmission block; the inner and outer gears are coaxially configured inside the throttle unit; the first one-way gear is configured inside the throttle unit and engages the second one-way gear through the coupling element.

Additionally, the transducer device contains a magnetic induction device inside the throttle unit which, together with the energy storage/release device, performs power transformation.

Additionally, the energy storage/release device is one of a spring, a coil assembly, and a power spring.

The safety protection device of the present invention provides more protection by allowing two or more parameters. Using household and public pipe systems as an example, everything behind the valve, including the pipeline, shall be within the claimed coverage. The number of the deployed safety protection devices according to the present invention can be greatly reduced compared to the conventional automatic faucet applications. The deployment cost of the present invention is therefore significantly reduced.

The safety protection device can be installed individually, or installed along with the automatic faucets. With two or more parameters to control operation and engagement, the safety protection device could provide superior protection and enhanced security.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The safety control device according to the present invention contains a control unit, a transmission unit, and a throttle unit, whose structure will described later. A related control method is described as follows:

Step A: setting a condition parameter X of the safety protection device's control unit;

Step B: engaging the safety protection device into an operational mode;

Step C: determining if an external condition $X_0$ satisfies the condition parameter X. If yes, continuing to the step D; otherwise, returning to the step B; and Step D: turning off the throttle unit through the transmission unit driven by the control unit so as to enforce protection.

Specifically, the condition parameter X can be a period of time of air flow, an amount of air flow, a period of time of fluid flow, an amount of fluid flow, a period of time of electricity consumption, an amount of electricity consumption, or other conditions of daily life.

After the condition parameter X is set, the operation mode of the safety protection device involves the provision of water, electricity, fuel, air, etc.

When the external condition $X_0$ satisfies the condition parameter X, the turning off of the throttle unit by the control unit could be embodied by the discharge of the control unit and sealing the throttle unit through the transmission unit so that the provision of water, electricity, fuel, air, etc. is stopped.

This control method fulfills automatic control and the saving of labor cost.

Preferably, step A further contains the setting of another condition parameter Y of the safety protection device's control unit. And step B further contains the step $B_{y1}$: determining if an external condition $Y_0$ satisfies the condition parameter Y and, if yes, returning to the step A.

In other words, the control unit can have two condition parameters X and Y.

For example, condition parameter X is set to supplying water continuously for 1 hour and condition parameter Y is to set to continuous water outage for 10 seconds.

When the external condition $X_0$ and $Y_0$ reflect that continuous water supply for half an hour and water outage for 8 seconds, the water supply will continue for another half an hour. Then, the external condition $X_0$ (continuous water supply for 1 hour) satisfies the condition parameter X and the safety protection device enters an engaged mode.

When the external condition $X_0$ and $Y_0$ reflect that continuous water supply for half an hour and water outage for 12 seconds, the external condition $Y_0$ satisfies the condition parameter Y and step A is repeated to reset the external condition $X_0$. Assuming that the water supply is restored, the water supply will then be continued for another 1 hour. Then, the water has been supplied for total 1.5 hours to satisfy the condition parameter X and the safety protection device enters an engaged mode.

Preferably, step A further contains the setting of yet another condition parameter Z of the safety protection device's control unit. And step B further contains the step $B_{z1}$: determining if an external condition $Z_0$ satisfies the condition parameter Z and, if yes, issuing an indication and returning to the step A.

In other words, the control unit can have three condition parameters X, Y, and Z.

For example, condition parameter X is set to supplying water continuously for 1 hour, condition parameter Y is to set to continuous water outage for 10 seconds, and condition Z is set to an amount of water flow of 1 ton, meaning an hour's normal water flow is greater than 1 ton.

When the external condition $Z_0$ satisfies the condition parameter Z meaning that the water supplied has reached 1 ton, an indication is issued.

This control method therefore is convenient, energy-saving, and electrically safe.

Preferably, step A further contains multiple condition parameters Yi. When any one of multiple external conditions $Y_0$ satisfies any one of the condition parameters Yi, the process will return to step A.

In other words, there can be multiple external conditions $Y_1, Y_2, \ldots$, and any external condition $Y_0$ satisfies any one of the condition parameters $Y_1, Y_2, \ldots$, the process will return to step A.

Preferably, the condition parameter Z contains multiple condition parameter values Zi and step B contains the step $B_{z2}$: determining if any one of multiple external conditions $Z_0$ satisfies any one of the condition parameter values Zi and, if yes, issuing an indication and continuing to the step D.

In other words, there can be multiple external conditions $Z_1, Z_2, \ldots$, and any external condition $Z_0$ satisfies any one of the condition parameters $Z_1, Z_2, \ldots$, the process will continue to step D.

This control method therefore fulfills multiple levels of control and achieves the goals of protection and saving by setting up multiple parameters for various external conditions.

As shown in FIGS. 1 to 8, a safety protection device 100 of the present invention contains a control unit 1, a transmission unit 3, and a throttle unit 5. A valve 40 is configured inside the throttle unit 5 and the valve 40 is connected to a base through a driving device 39. The valve 40 is also connected to the transmission unit 3. The control unit 1 contains an energy storage/release device configured on the throttle unit 5. A moveable block 13 is configured inside the energy storage/release device. The transmission unit 3, together with the block 13, controls the open and close of the valve 40.

For the safety protection device 100 provided by the present invention, an external force is first applied to the transmission unit 3 so as to set up a condition. After the external force is removed, the transmission unit 3 is locked to the block 13 and the valve 40 is opened in an operation mode. When the condition is satisfied, the control unit 1 discharges to eject the block 13, the valve 40 is closed, and the safety protection device 100 enters an engaged mode. As such, the safety protection device provided by the present invention intelligently fulfills the condition configuration and engagement, which is convenient and safe.

The driving device 39 can be a spring, an elastic piece, or other device capable of fulfilling similar function.

The energy storage/release device can be a coil assembly which contains a first coil 11 and a second coil 12. It can also be a spring, a power spring, an elastic piece, or other device capable of fulfilling similar function.

The control unit 1 allows the configuration of more than one condition parameter such as, as described above, X, Y, Z, etc., for the control of the provision of electricity, water, fuel, air, etc. so that the operation is more safe and convenient.

Preferably, the safety protection device 100 is further configured with a transducer device which turns the power output by a fluid material flowing through the safety protection device 100 into a driving force.

The transducer device contains a magnetic induction device 9 inside the throttle unit 5 which, together with the energy storage/release device, performs power transformation.

The magnetic induction device 9 is adjacent to the first coil 11. The magnetic induction device 9 contains a pair of magnetic devices 91 connected by a rod which in turn is connected to a fan 8 through a shaft 10. When the fan 8 turns, the pair of magnetic devices 91 turns as well so that the energy of the flowing fluid material is transformed into electricity by the first coil 11. Through an integrated circuit 14, the electricity is discharged to the second coil 12. As such, energy preservation and environment protection is achieved from the very beginning.

Figure 9:
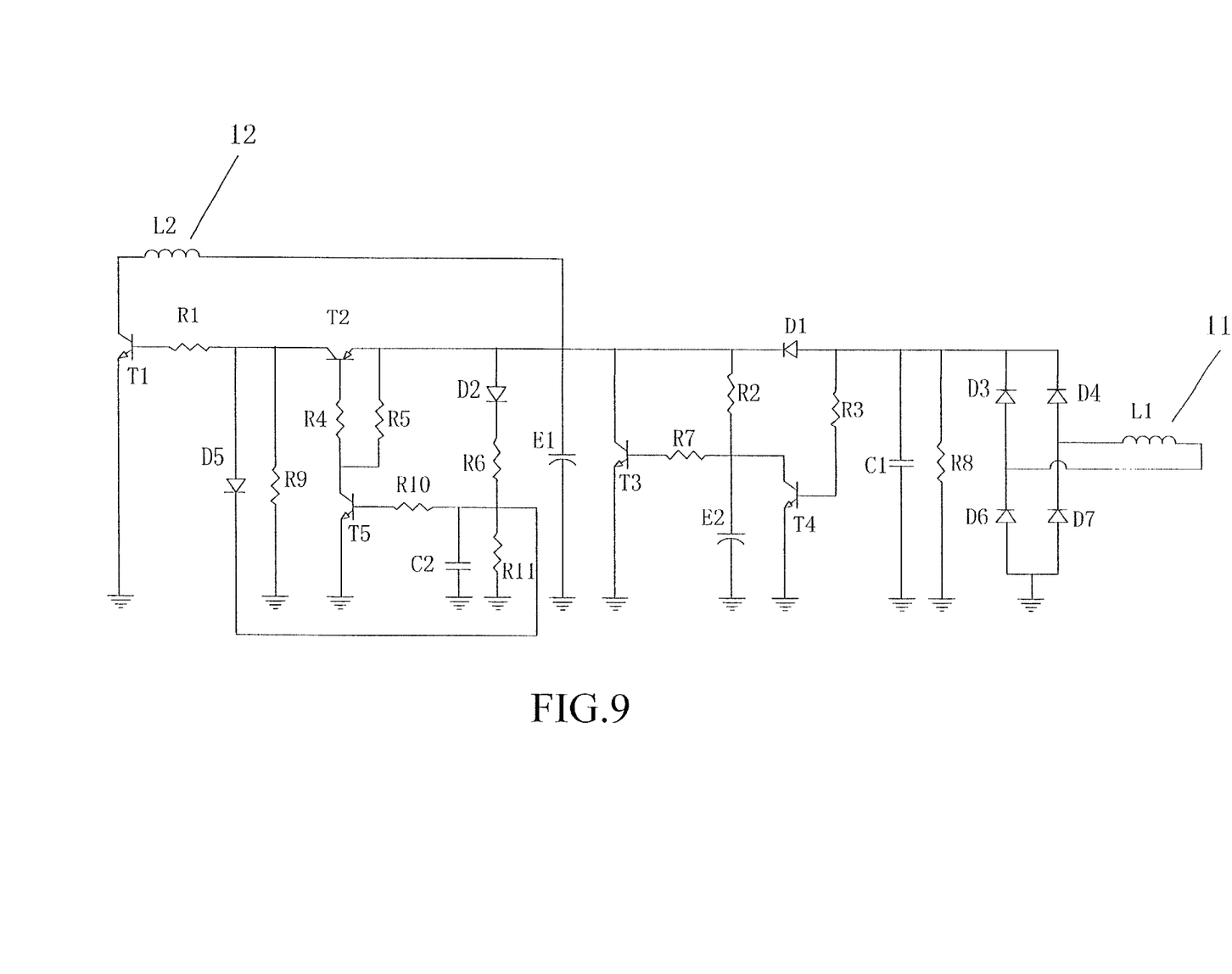
FIG. 9 is a circuit diagram showing the control unit of the safety protection device according to the present invention.

As shown in FIG. 9, the energy transformed from the magnetic induction device 9 through the first coil 11 is stored entirely to a capacitor E1. When an external condition is satisfied, the energy stored in the capacitor E1 is released altogether to the second coil 12. Together with FIG. 5, the discharge of the second coil 12 ejects the block 13 so as to move the transmission unit 3 and control the open and close of the valve 40.

The transmission unit 3 contains an elastic element 31, a transmission block 32, a coupling element, an outer gear 35, an inner gear 36, a first one-way gear 34 engaging the outer gear 35, and a second one-way gear 37 engaging the inner gear 36. An end of the elastic element 31 is connected to the throttle unit 5 and the other end is connected to the transmission block 32. The inner and outer gears 36 and 35 are coaxially configured inside the throttle unit 5. The first one-way gear 34 is configured inside the throttle unit 5 and engages the second one-way gear 37 through the coupling element.

The coupling element contains magnetic attraction devices 33, one configured beneath the transmission block 32 and the other one configured at an end of the first one-way gear 34. The transmission block 32 engages the first one-way gear 34 through the two magnetic attraction devices 33.

The magnetic attraction devices 33 could be two magnets of reversed polarities, one magnet and the other an iron block, or other combination of similar function.

The throttle unit 5 contains a channel having a channel inlet 51 and a channel outlet 52. A fixation element 6 and a blocking plate 7 are positioned between the channel inlet and outlet 51 and 52. The second coil 12 is positioned between the fixation element 6 and the blocking plate 7. An end of the elastic element 31 is connected to the fixation element 6 and the other end to the transmission block 32.

The intelligent safety protection device 100 of the present invention has three modes: a configuration mode, an operation mode, and an engaged mode.

Figure 2:
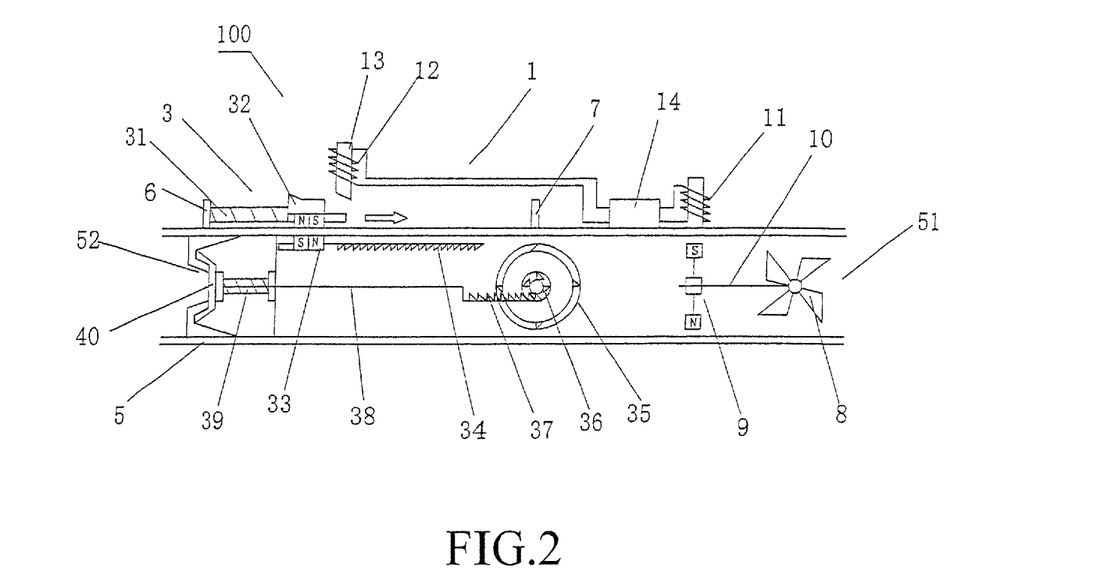
FIG. 2 is a sectional diagram showing the safety protection device of FIG. 1 when an external force is applied for configuration.
Figure 3:
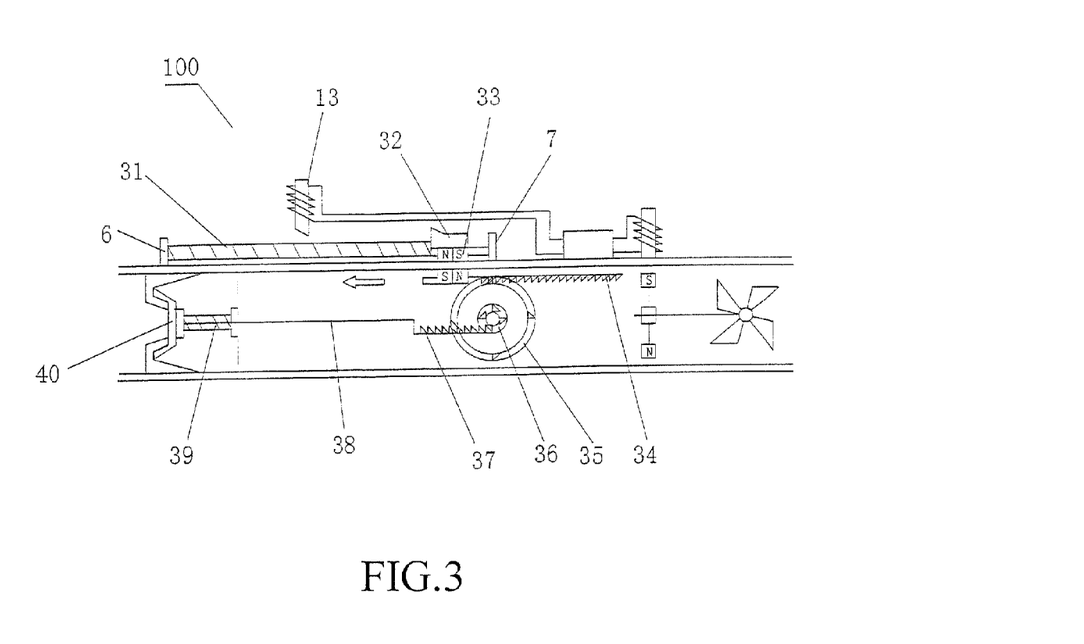
FIG. 3 is a sectional diagram showing the safety protection device of FIG. 2 when external force is removed
Figure 4:
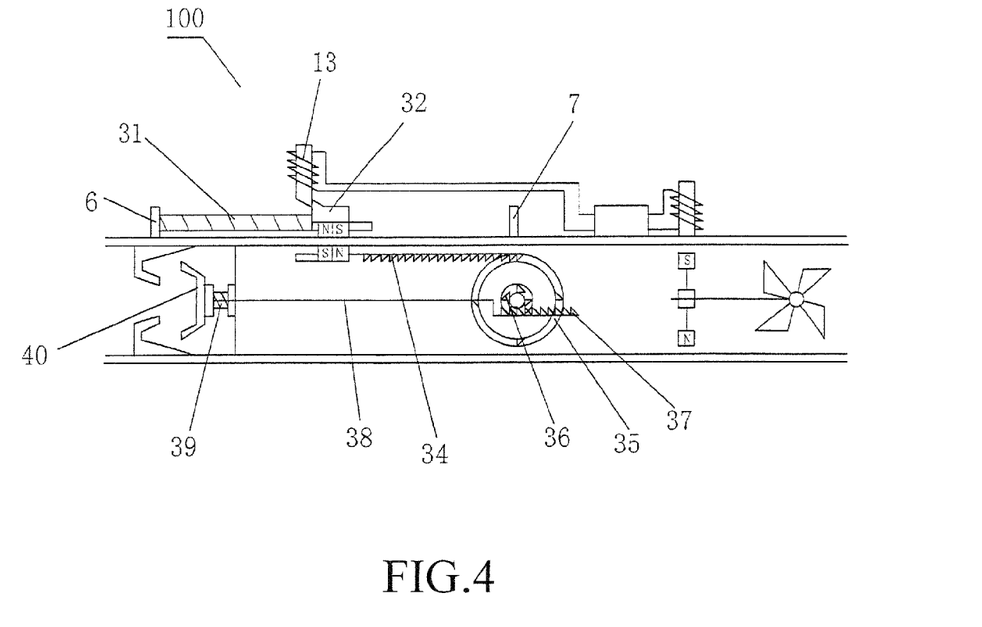
FIG. 4 is a sectional diagram showing the safety protection device of FIG. 3 after the safety protection device is configured.

More specifically, as shown in FIGS. 2 to 4, the configuration mode is as follows. The transmission block 32 is pulled by an external force (such as by hand) to the blocking plate 7. Under the working of the magnetic attraction devices 33, the first on-way gear 34 is pulled along with the transmission block 32. As shown in FIGS. 2 and 3, when the first one-way gear 34 moves towards the channel inlet 51 and since it is a one-way gear, the outer gear 35 does not turn. When the external force is removed at the blocking plate 7, the first one-way gear 34 is moved towards the fixation element 6 by the elastic element 31. In the meantime, the first one-way gear 34 is moved towards the channel outlet 52 by the magnetic attraction devices 33. The outer gear 35, engaged by the first one-way gear 34, in turn engages the coaxial inner gear 36. The inner gear 36 then engages the second one-way gear 37 to move towards the channel inlet 51. The valve 40 is also moved towards the base by a connection rod 38 connected to the second one-way gear 37. The valve 40 is therefore opened by moving away from the channel outlet 52.

The operation mode is as follows. As shown in FIG. 4, when the valve 40 is opened, material (e.g., gas, fuel, water, etc.) is allowed to flow in through the channel inlet 51 and to flow out through the channel outlet 52.

Figure 1:
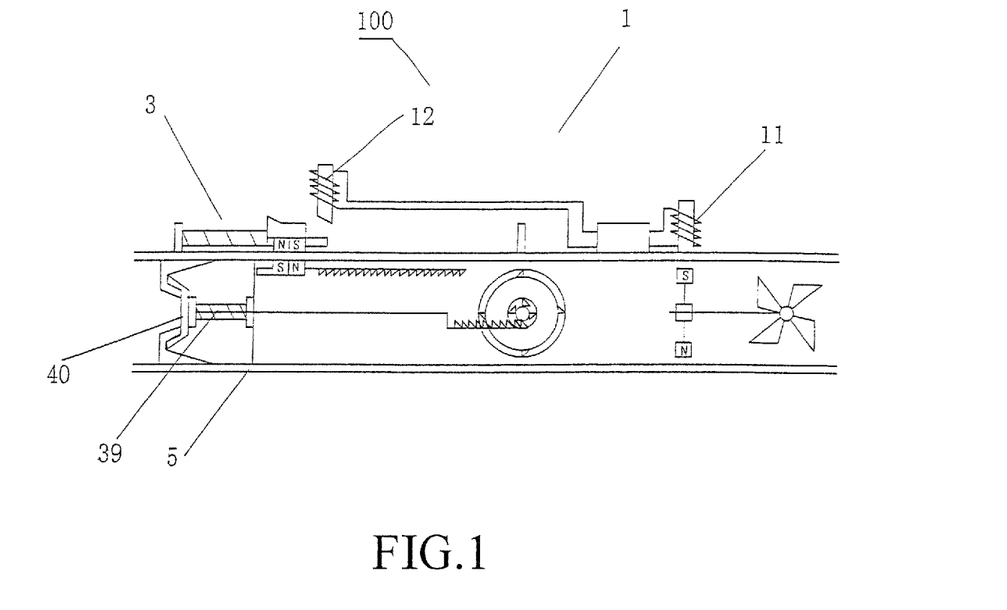
FIG. 1 is a sectional diagram showing the safety protection device according to the present invention.
Figure 7:
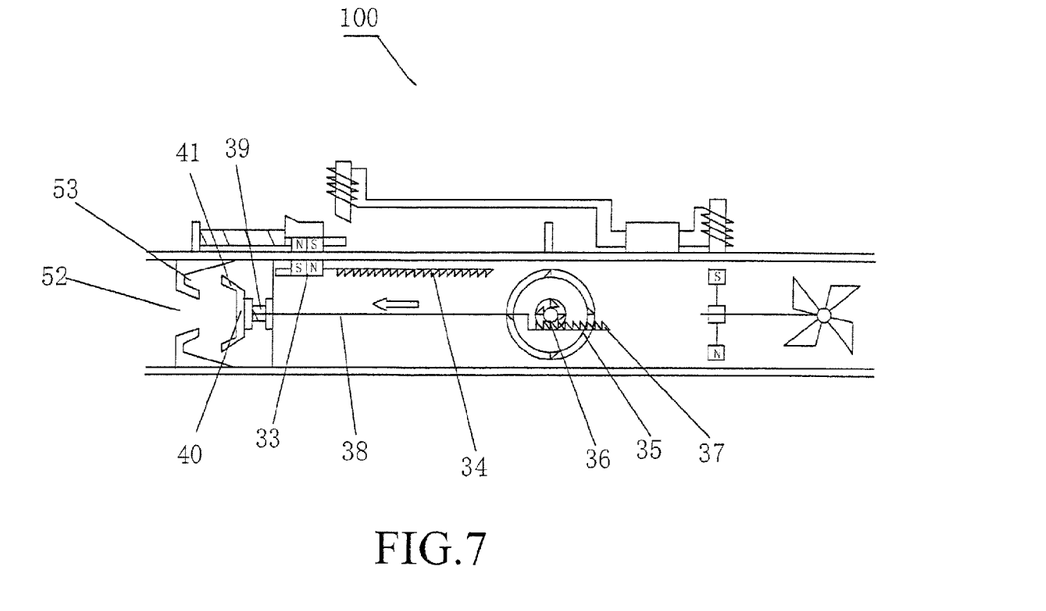
FIG. 7 is a sectional diagram showing the safety protection device of FIG. 6 when the valve is moved towards the channel outlet.
Figure 8:
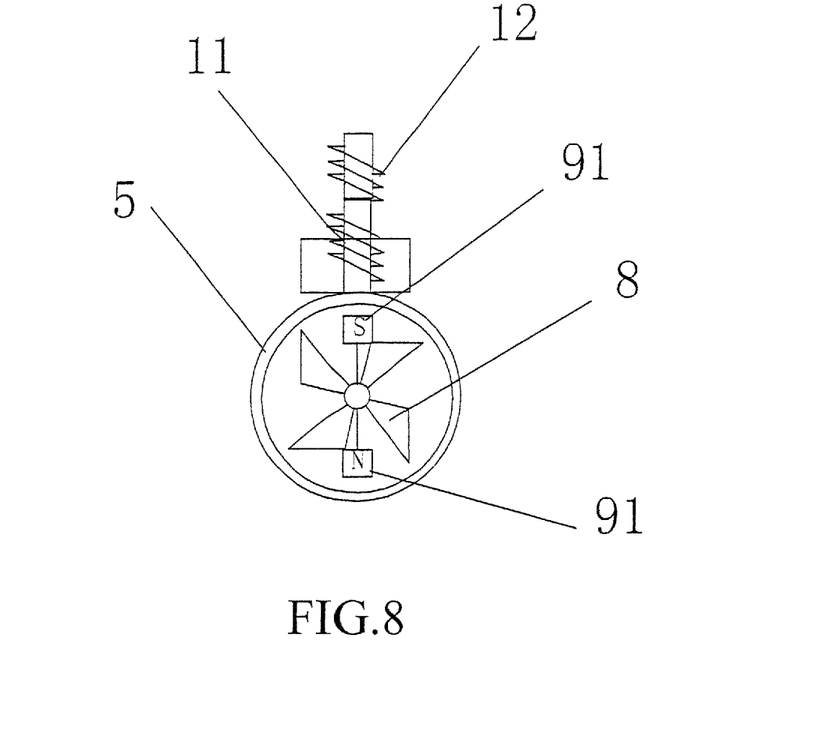
FIG. 8 is a side-view diagram showing the safety protection device of FIG. 7.

The engaged mode is as follows. When a condition is satisfied (e.g., the duration since power up or water provision has reached a specified interval, etc.), as shown in FIGS. 4 to 8, the integrated circuit 14 of the control unit 1 discharges towards the second coil 12 using the energy provided by the first coil 11. The transmission block 32 breaks away from the block 13 and moves towards the fixation element 6 by the resilience of the elastic element 31. In the meantime, the first one-way gear 34 moves towards the direction and, as shown in FIG. 7, it is separated from the outer gear 35. Under the operation of the driving device 39, the valve 40 moves towards the channel outlet 52 and engages the connection rod 38 and the second one-way gear 37 to moves also towards the channel outlet 52. The inner gear 36 coupled to the second one-way gear 37 as such is turned and the valve 40 is closed when it seals the channel outlet 52, as shown in FIG. 1. At the moment, the provision of the material is stopped, achieving convenient and safe usage.

Figure 5:
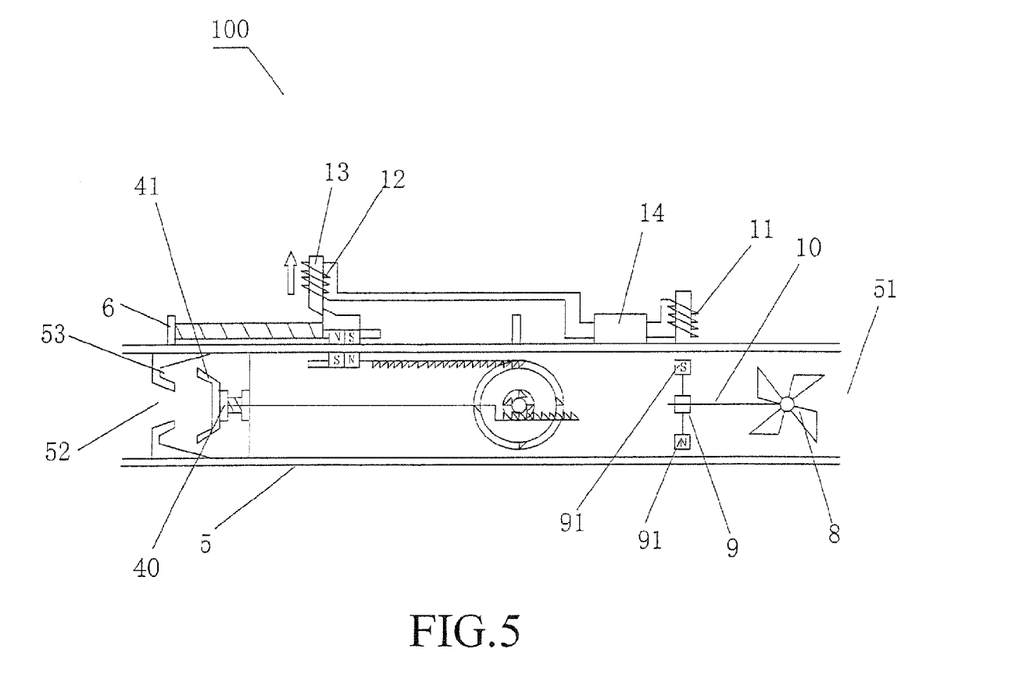
FIG. 5 is a sectional diagram showing the safety protection device of FIG. 4 when the safety protection device is engaged.
Figure 6:
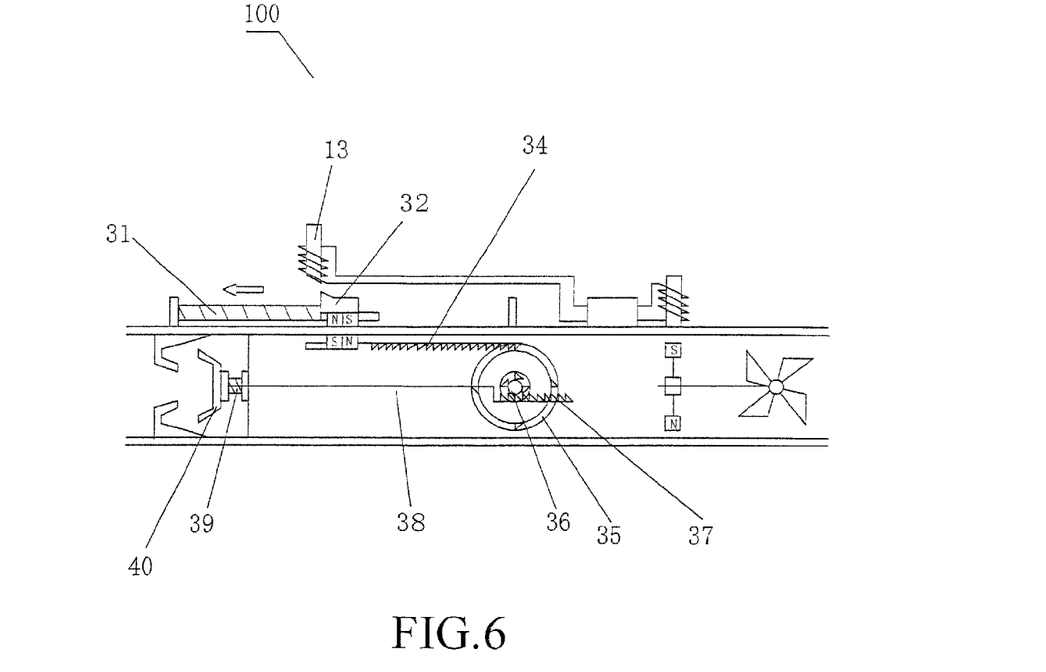
FIG. 6 is a sectional diagram showing the safety protection device of FIG. 5 when the first one-way gear moves.

As shown in FIG. 5, to enhance the tightness of the valve 40, an indentation 53 is configured at the channel outlet 52 and a matching protrusion 41 is configured on the valve 40. In the engaged mode, the protrusion 41 of the valve 40 is embedded into the indentation 53 so as to achieve superior tightness.

As shown in FIG. 9, L1 provides energy to the control unit 1 after the rectification and filtering by D3, D4, D6, D7, R8 and C1, and charges E1 through D1.

T1, T2, T5, D2, R1, R4, R5, R6, R9, R10, R11 and C2 constitute a charging voltage measurement circuit.

When E1's voltage reached a specified value, the above mentioned circuit is locked by the feedback through D5 so that E1 discharges to L2.

T3, T4, R2, R3, E2, and R7 constitute a discharging time measurement circuit.

The present invention provides a control method for a safety protection device which fulfills automatic control, reduced human cost, enhanced security through two or more parameters, multiple-leveled control by associating multiple parameters to a same external condition, so as to achieve the goal of safety protection and energy saving.

The safety protection device of the present invention provides more protection by allowing two or more parameters. Using household and public pipe systems as an example, everything behind the valve 40, including the pipeline, shall be within the claimed coverage.

The number of the deployed safety protection devices according to the present invention can be greatly reduced compared to the conventional automatic faucet applications. The deployment cost of the present invention is therefore significantly reduced.

The safety protection device can be installed individually, or installed along with the automatic faucets. With two or more parameters to control operation and engagement, the safety protection device could provide superior protection and enhanced security.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A safety protection device, comprises a control unit; a transmission unit; and a throttle unit; wherein the transmission unit comprises an elastic element, a transmission block, a coupling element, an outer gear, an inner gear, a first one-way gear engaging the outer gear, and a second one-way gear engaging the inner gear; an end of the elastic element is connected to the throttle unit and the other end is connected to the transmission block; the inner and outer gears are coaxially configured inside the throttle unit; the first one-way gear is configured inside the throttle unit and engages the second one-way gear through the coupling element;

a valve is configured inside the throttle unit; the valve is connected to a base through a driving device; the valve is connected to the transmission unit; the control unit comprises an energy storage/release device configured on the throttle unit; a moveable block is configured inside the energy storage/release device; and the transmission unit, together with the block, controls the open and close of the valve.

2. The safety protection device according to claim 1, wherein the control unit has one or more configurable condition parameters.

3. The safety protection device according to claim 1, further comprising a transducer device which turns power output by a fluid material flowing through the safety protection device into a driving force.

4. The safety protection device according to claim 3, wherein the transducer device comprises a magnetic induction device inside the throttle unit which, together with the energy storage/release device, performs power transformation.

5. The safety protection device according to claim 1, wherein the energy storage/release device is one of a spring, a coil assembly, and a power spring.

* * * * *